Jan. 22, 1963 H. W. CHAPMAN ETAL 3,074,359
FREIGHT BRACING APPARATUS
Filed Aug. 14, 1958 2 Sheets-Sheet 1
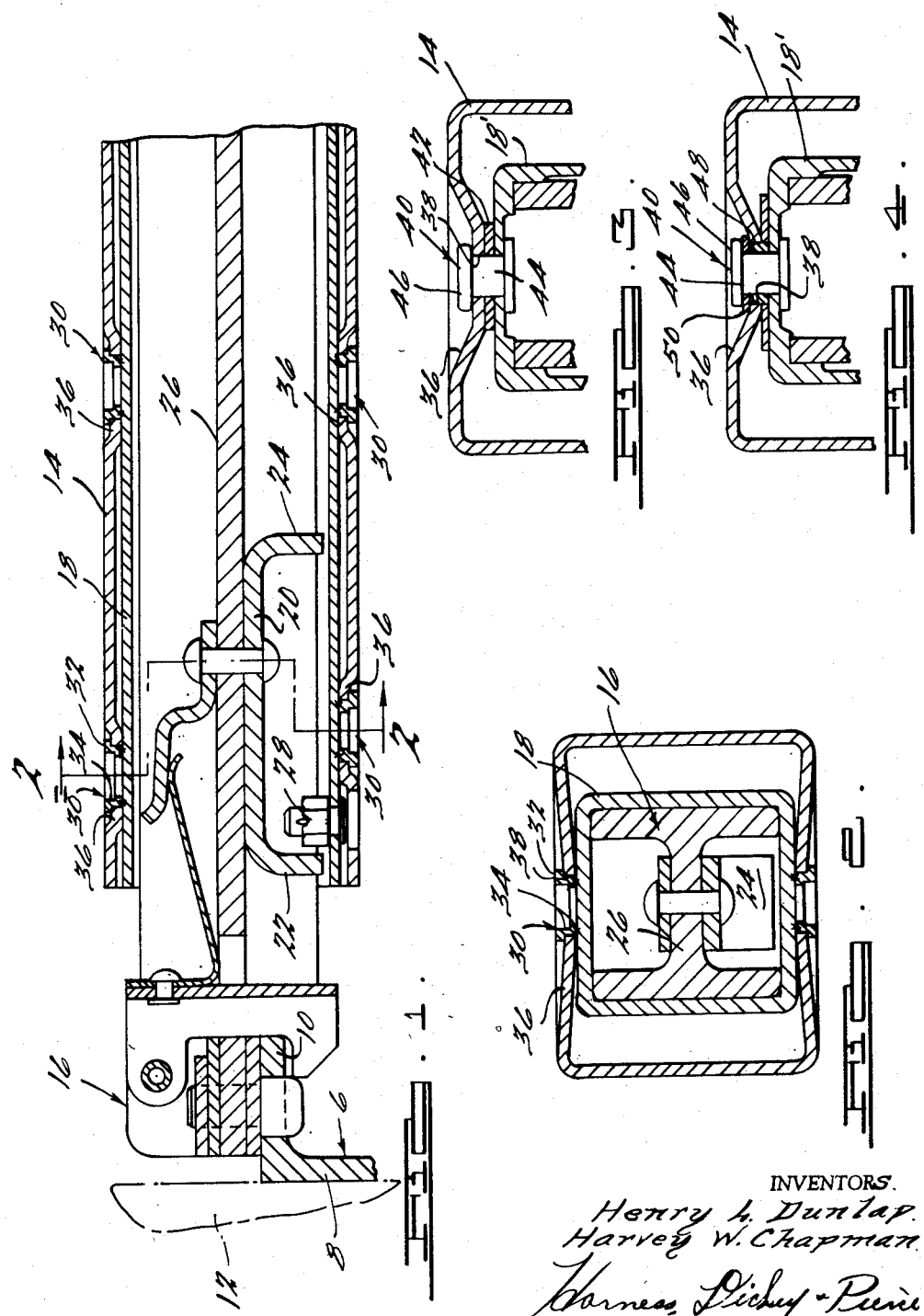
INVENTORS.
Henry L. Dunlap.
Harvey W. Chapman
ATTORNEYS.

Jan. 22, 1963 H. W. CHAPMAN ETAL 3,074,359
FREIGHT BRACING APPARATUS
Filed Aug. 14, 1958 2 Sheets-Sheet 2
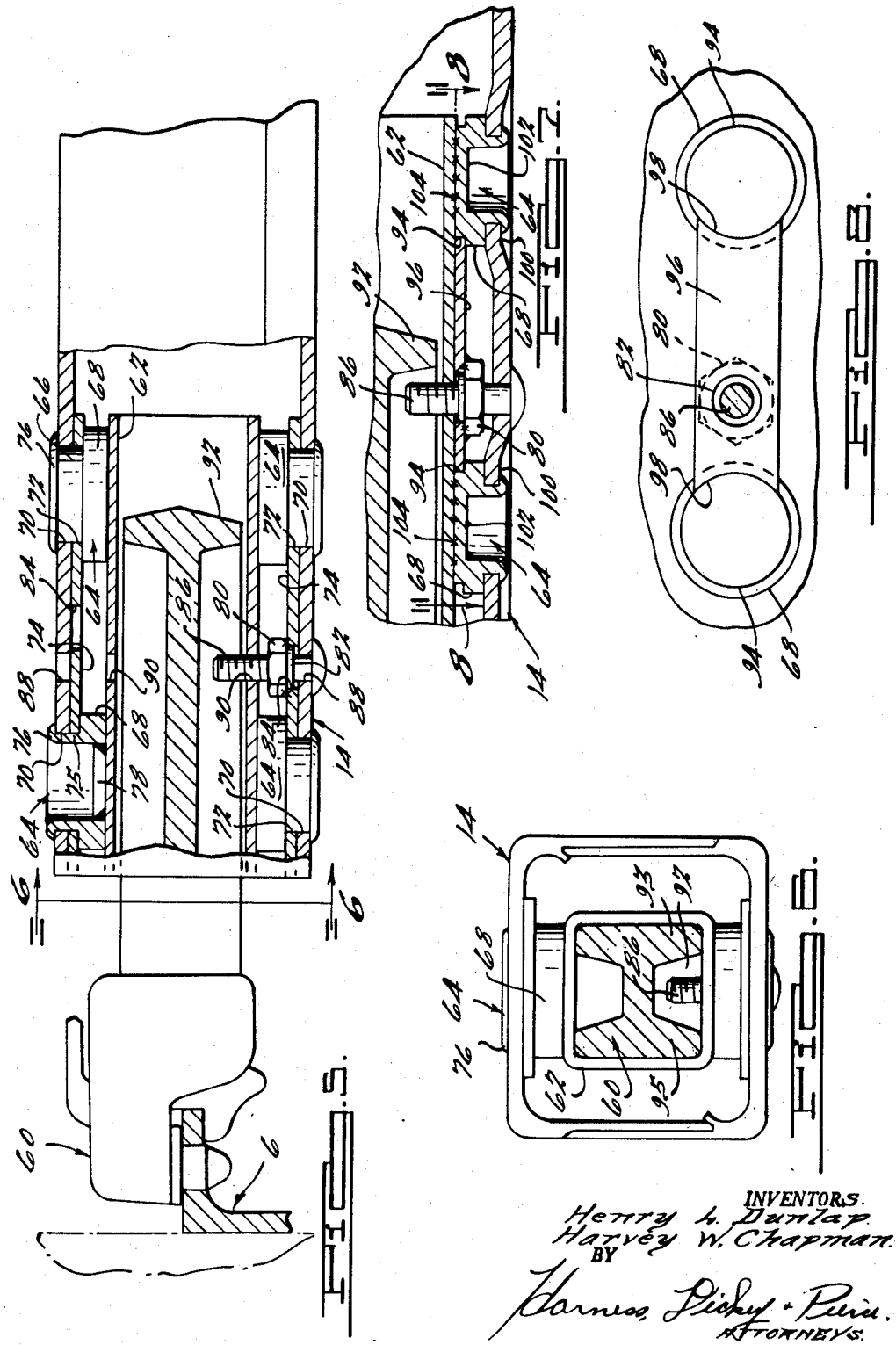
INVENTORS.
Henry L. Dunlap
Harvey W. Chapman
BY
Harness, Dickey & Pierce
ATTORNEYS.

United States Patent Office
3,074,359
Patented Jan. 22, 1963

3,074,359
FREIGHT BRACING APPARATUS
Harvey W. Chapman, Detroit, and Henry L. Dunlap, Dearborn, Mich., assignors to Evans Products Company, Plymouth, Mich., a corporation of Delaware
Filed Aug. 14, 1958, Ser. No. 755,002
6 Claims. (Cl. 105—369)

My invention relates to cargo bracing equipment such as is commonly used in railroad freight cars, ships, trucks, and storage compartments in general where it is desired to hold articles of freight in proper position so as to prevent damage to them. In particular, my invention refers to an improved construction for connecting an attaching means to a cargo bracing bar.

It is one object of my invention to provide a connection for affixing an attaching means within one end of a cargo bracing bar.

It is a further object of my invention to provide a connection for attaching a steel sleeve within the end of an aluminum cargo bracing bar to enable an end fitting to be telescopically mounted within the steel sleeve for attaching the bar to a supporting member.

It is a still further object of my invention to provide a construction for positioning and connecting an end fitting within the end of a cargo bracing bar having a relatively large cross section.

Another object of my invention is to provide a connection for attaching two members that cannot be welded together.

Another object of my invention is to provide a connecting means which facilitates the connection of steel to aluminum in a rapid and extremely rugged and economical manner.

Another object of my invention is to provide a lightweight cargo bracing bar and attachment means designed to withstand the impact loads imparted thereto by the various directions in which it is urged in use.

Other objects and features of my invention will become apparent upon consideration of the accompanying drawings, wherein:

FIGURE 1 is a broken longitudinal sectional view of one form of my invention;

FIG. 2 is a cross section, taken along the line 2—2 of FIG. 1;

FIG. 3 is a broken cross section similar to FIG. 2 illustrating another form of my invention;

FIG. 4 is a broken cross section similar to FIG. 3 illustrating still another form of my invention;

FIG. 5 is a longitudinal sectional view of still another form of my invention;

FIG. 6 is a cross section, taken along the line 6—6 of FIG. 5;

FIG. 7 is a broken longitudinal sectional view of a modification of the structure illustrated in FIG. 5; and FIG. 8 is a cross section taken along the line 8—8 of FIG. 7.

As described in more detail in Patents Nos. 2,497,683, 2,725,826 and 2,879,721, freight or cargo bracing bars are preferably used in connection with an angled support element 6 having a vertical flange 8 and a horizontal flange 10. In the case of a boxcar or truck, the support elements 6 are located in pairs on opposite sides of the body of the car or truck and extend longitudinally fore and aft thereof being entirely parallel to the floor and affixed to the side walls 12 of the body as by welding. The angled support elements 6 in a pair are commonly referred to as a "belt line" and are nearly always on the same level, that is, located the same distance above the floor of the body.

The cargo bracing bar is comprised of a cross bar 14 having an end fitting 16 at each end thereof which is adapted to be connected to the angled support elements 6 so that the bar can extend transversely between the walls 12. To simplify the presentation of the invention, only one end of the cargo bracing bar is shown in the drawings since the other end is similar in construction and hence need not be illustrated. Further, while I have shown in the drawings an end fitting 16 which can telescope with respect to the cross bar 14, it will be appreciated that the fitting could be made rigid with the end of the bar and, in fact, I prefer that there be one rigid and one telescopic used on each cross bar. The end fitting 16 is of the type illustrated in the aforesaid copending application and is telescopically mounted within a square tubular sleeve 18, preferably made of steel, which in turn is disposed within and connected to the end of the cross bar 14. A U-shaped stop member 20 having legs 22 and 24 is affixed to web 26 of the end fitting 16 and a bolt and nut 28 is affixed to and projects within the sleeve 18 to limit the telescoping action of the end fitting to the distance between the legs 22 and 24 of the U-shaped stop.

As most clearly illustrated in FIG. 2, the cross bar 14 has a relatively large cross section to provide structural rigidity since it is preferably made of aluminum or other lightweight metal to reduce the weight of the bar. The sleeve 18 is positioned within the bar 14 by hollow connectors 30 having a flanged portion 32 and a body portion 34. It will be observed that the body portion 34 of each connector has a height substantially equal to the thickness of depressed wall portions 36 of the cross bar 14 and is disposed within apertures 38 therein. The end of the body portion 34 of each of the connectors which are also preferably made of steel, contacts the surface of the sleeve 18 and is stud welded thereto. With this construction, the flanged portion 32 of the connector 30 tightly clinches the wall portion 36 of the cross bar 14 so that the sleeve 18 is rigidly positioned relative thereto. Of course, while stud welding is the preferred method of joining the connector to the steel tube, it is by no means the only acceptable method since spot welding may be employed by merely closing the bottom of the connector, and normal arc welding methods could also be employed.

It will be observed that the wall portions 36 of the cross bar 14 are depressed inwardly so as to contact portions of the surface of the sleeve 18 to permit the connectors 30 to make the connection therebetween. With this construction, the cross bar 14 does not have to be extruded with the cross section thereof having a height equal to the height of the sleeve 18, and also any variations in aluminum extrusions, such as canting, which would affect the connection made by the connectors 30, can readily be compensated for by the depressed portions 36 since they are formed after the tube is extruded.

Another advantage of the depressed wall portions 36 lies in the fact that for purposes of economy, it is often preferable to use a stock or standard size of square tubing for the steel sleeve 18 which size often differs from the height of the cross section of the cross bar 14 which is determined by design parameters in order to provide the necessary structural rigidity for the bar. Therefore, the depressed wall portions 36 provide a convenient way for compensating for any dimensional differences between the cross bar 14 and the sleeve 18.

Referring to FIG. 3, another form of the invention is shown wherein a sleeve 18' of extruded aluminum is connected to the cross bar 14 by a rivet 40 rather than by the welded connector 30. A washer-shaped spacer 42 is also disposed between the sleeve and the cross bar and about the body 44 of the rivet to prevent the body 44 from expanding outwardly into the space between the sleeve and the bar when head 46 is formed thereon. Experience has proved that when the rivets 40 are employed, the body 44 tends to expand into any space between the sleeve 18' and the cross bar 14 after they are assembled and when the pressure is applied to form the head 46. However, the provision of the spacer 42 restricts the tendency of the body portion to expand.

Referring to FIG. 4, a bushing 48 is illustrated which provides an additional means for preventing the expansion of the body 44 of the rivet 40 when the head 46 is formed. A washer 50 is also disposed between the head 46 of the rivet and the depressed wall portion 36 of the cross bar 14 to prevent deformation about the aperture 38 during the formation of the head 46 of the rivet.

Another form of the invention is illustrated in FIGS. 5 and 6 wherein the cross bar 14 is releasably connected to the angled support element 6 by an end fitting 60 which is of a slightly different construction than the end fitting 16 previously described.

The right end of the end fitting is telescopically mounted within a square tubular sleeve 62 which is coaxially mounted within the cross bar 14 by a plurality of hollow connectors 64. Each connector has a body portion 66 and a relatively thick flanged portion 68, the body portion 66 extending through suitable apertures 70 and 72 in the cross bar 14 and steel reinforcing plate 74 respectively.

It will be observed that there are two reinforcing plates 74, one above and one below the sleeve 62 and that the flanged portion 68 of each connector urges the reinforcing plates against the inner surface of the cross bar while the end of the body portion 66 of each connector is headed as at 76 to tightly clinch the reinforcing plates to the cross bar.

With this construction, the steel plates 74 are tightly clinched to the cross bar 14 and serve as reinforcing plates which resist the twisting of the ends of the cross bar 14 that sometimes occurs due to the forces applied to the cross bar and end fitting. With the connectors 64 in position, it is a relatively simple matter to slide the sleeve 62 between the connectors for welding thereto, as previously described in connection with the connectors 30 illustrated in FIGS. 1 and 2, the flanged portions 68 serving as spacers to properly position or center the sleeve 62 within the cross bar 14. If the connectors do not quite engage the steel sleeve, the walls of the cross bar 14 may be depressed by a suitable clamping force exerted on the walls of the cross bar 14 to bring the connectors into contact with the sleeve 62 and compensate for any such spacing which may occur. It will also be observed that the connectors 64 are relatively large in size so as to provide a greater bearing area on the aluminum cross bar 14 and to permit the weld to be distributed over a greater area of the sleeve 62.

As most clearly illustrated in FIGS. 5 and 6, a nut 80 having a pilot portion 82 is projection welded, or otherwise secured, to the lower reinforcing plate 74 with the pilot portion disposed within a suitable aperture 84 in the reinforcing plate. The nut provides a convenient means for retaining a bolt 86 passing through suitable apertures 88 and 90 in the cross bar and sleeve respectively and projecting within the sleeve 62 to limit the telescoping action of the end fitting 60.

It will be observed that the portion of the end fitting disposed within the sleeve 62 is H-shaped in cross section with an end wall 92 extending transversely across the right end thereof. Therefore, the bolt 86 extends between legs 93 and 95 of the end fitting and is adapted to engage the end wall 92 to limit telescoping action to the left as viewed in FIG. 1. Of course, since the head of the bolt 86 is accessible from the exterior of the cross bar, it can readily be retracted so that it will clear the end wall 92 to permit the end fitting to be easily removed from the sleeve 62. In this manner, the lower plate 74 not only serves as a reinforcing plate, but also as a mounting plate for the nut 80 to permit the bolt 86 to be removably projected within the sleeve 62.

Referring to FIG. 5, it will be observed that the upper wall of the sleeve 62 and the cross bar 14 also have apertures 90 and 88 therein respectively which are aligned with the apertures in the lower portions of these members, and that the upper plate 74 has an aperture 84 therein which is not in alignment with the remaining apertures. The aperture 84 in the upper reinforcing plate is offset so as to prevent dirt particles and the like from passing therethrough. This is accomplished by merely reversing the plate end-for-end so that the aperture 84 therein is not aligned with the remaining apertures. In this manner, production economies may be realized since each of the plates may be made with the identical apertures therein, and also each of the channel-shaped members which make up the cross bar 14 may be formed with the holes 88 therein to eliminate the necessity of stocking plates with and without the apertures 84 and channel-shaped members with and without the apertures 88.

At this point it may again be noted that in the structure of FIGS. 5 and 6, the sleeve 62, connectors 64 and reinforcing plates 74 may be made of steel or other suitable metal having the required structural characteristics, as well as, lending itself to welding as previously described. By using the connectors 64, the sleeve and reinforcing plates can be positioned within the cross bar 14 by welding even though the cross bar is preferably made of a lightweight metal, such as aluminum, which cannot be welded to the metal of the plates and sleeve.

Referring to FIGS. 7 and 8, a modification of the structure of FIG. 5 is illustrated wherein an annular portion of the connectors 64 are removed to form a boss 94 having a height substantially equal to or slightly greater than a plate 96, the plate having arcuate ends 98 to enable the plates to be supported on the flanged portions 68 of the connectors and locked against the boss 94, as most clearly illustrated in FIG. 8. Since the depth of each boss is equal to or greater than the thickness of the plate 96 the plate will not project thereabove to interfere with the insertion of the sleeve 62. Also, when the sleeve is inserted within the cross bar 14, the plate 96 will be locked in place between the sleeve and the flanged portions 68 of the connectors. The connectors may then be welded to the sleeve 62 to secure it in position, the outer ends of the connectors being headed, as previously described, to clinch them to the wall of the cross bar 14.

The nut 80 is projection welded or otherwise secured to the plate 96, as previously described, but since the plate abuts against the sleeve, the nut is welded on the underside thereof. The bolt 86 is also provided, as previously described, so as to project within the sleeve 62 in position to engage the end wall 92 of the end fitting to limit the telescoping action thereof to the left.

This construction enables portions 100 of the wall of the cross bar 14 to be displaced inwardly to compensate for relatively large differences between the outside dimension of the sleeve 62 and the inside dimension of the cross bar 14. It is apparent that where these dimensional differences are great enough, it would be impractical to compensate for this by increasing the thickness of the flanged portions 88 of the connectors as was done in the embodiment illustrated in FIG. 5. It is also apparent that if the portions 100 of the wall of the cross bar 14 are to be displaced inwardly it is preferable that the plates 96 not be clinched to the wall of the cross bar by the connectors 64, as in FIG. 5, since this would interfere with the displacement of the wall and would not provide room either above or below the plate for mounting the nut 80.

It will also be observed that in the embodiment illustrated in FIG. 7, the connectors 64 are also hollow but that a wall 102 is provided across the bottom thereof to enable the connectors to be spot welded to the sleeve 62, as indicated at 104, whereas in the embodiment illustrated in FIG. 5, the connectors are preferably arc welded to the sleeve 62 by weld metal deposited at the lower edge of the inner surface thereof.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a cargo bracing bar, an elongated hollow cross bar, a sleeve coaxially disposed within one end of said cross bar, a plurality of hollow connectors for mounting said sleeve within the cross bar, each of said connectors having a boss on one end thereof, an intermediate flanged portion and a body portion, said flanged portion being disposed between the wall of the cross bar and said sleeve with said body portion projecting through a suitable aperture in the wall of the cross bar and headed to tightly clinch the flanged portion of the connector against the wall of the cross bar, said boss portion being secured to said sleeve, and a plate locked between said sleeve and the flanged portions of the connectors.

2. The subject matter as claimed in claim 1 including an end fitting having a shank extending into said sleeve, a nut disposed between said plate and cross bar and secured to the plate, and a bolt passing through aligned apertures in the wall of the cross bar, the plate and the sleeve so as to project within the sleeve and threadably engage said nut, said bolt and said end fitting shank co-operating to limit movement of said end fitting in one direction relative to said sleeve.

3. In a cargo bracing bar, an elongated tubular crossbar having spaced wall portions, a sleeve coaxially disposed within one end of said bar between said wall portions, and a plurality of flanged connectors extending through said portions of the walls of said bar and affixed to said sleeve, said flanged connectors mechanically locking the bar to the sleeve for rigidly positioning the sleeve within said bar, each of said portions of the walls of said bar being displaced inwardly of said tubular crossbar relative to the wall of which it forms a portion toward said sleeve, and said connectors connecting said portions to the sleeve.

4. In a cargo bracing bar, an elongated tubular crossbar, having spaced wall portions, a sleeve coaxially disposed within one end of said bar between said wall portions, and a plurality of flanged connectors extending through said portions of the walls of said bar and affixed to said sleeve, said flanged connectors mechanically locking the bar to the sleeve for rigidly positioning the sleeve within said bar, each of said portions of the walls of said bar being displaced inwardly of said tubular crossbar relative to the wall of which it forms a portion so as to contact portions of the wall of said sleeve, and said connectors connecting said portions of the wall of said bar to said portions of the wall of said sleeve.

5. The subject matter as claimed in claim 4 wherein each of said connectors comprises a body portion surmounted by a flanged portion, the length of said body portion being equal to the thickness of said displaced portions of the wall of the bar, and said flanged portion engages the outer surface of the bar whereby said sleeve is tightly clinched to the bar.

6. In a cargo bracing bar, an elongated hollow crossbar for engaging cargo, a sleeve coaxially disposed within one end of said crossbar, a plurality of flanged hollow connectors secured to said sleeve and mechanically connected to the crossbar for positioning the sleeve relative to the crossbar, each of said connectors having a body portion with a flanged portion on one end thereof, said flanged portion being secured to the sleeve and said body portion projecting through an aperture in the wall of the crossbar, the other end of said body portion being headed over to clinch the flanged portion of the connector to the wall of the crossbar, a reinforcing plate clinched to the inner surface of the wall of the crossbar by the flanged portions of the connectors, an end fitting having a shank extending into said sleeve, a nut disposed between the reinforcing plate and the sleeve and secured to the plate, a bolt passing through suitable aligned apertures in the wall of the crossbar, the reinforcing plate and the sleeve so as to project within the sleeve and threadably engage the nut to permit the removal of the bolt from the exterior of the crossbar, said bolt in said end fitting shank co-operating to limit movement of said end fitting in one direction relative to said sleeve.

References Cited in the file of this patent

UNITED STATES PATENTS

| | | |
|---|---|---|
| 1,630,669 | Mossberg | May 31, 1927 |
| 1,730,034 | Faulk | Oct. 1, 1929 |
| 1,876,811 | Whitworth | Sept. 13, 1932 |
| 1,954,581 | Wortmann | Apr. 10, 1934 |
| 2,005,247 | Thompson | June 18, 1935 |
| 2,040,102 | Peron | May 12, 1936 |
| 2,089,805 | Lear | Aug. 10, 1937 |
| 2,117,500 | Rambush et al. | May 17, 1938 |
| 2,293,894 | Fether | Aug. 25, 1942 |
| 2,298,140 | Mace | Oct. 6, 1942 |
| 2,361,635 | Koppel | Oct. 31, 1944 |
| 2,501,772 | Guard | Mar. 28, 1950 |
| 2,546,929 | Nampa | Mar. 27, 1951 |
| 2,602,564 | Zisken et al. | July 8, 1952 |
| 2,682,920 | Mueller | July 6, 1954 |
| 2,690,853 | Kircher | Oct. 5, 1954 |
| 2,769,404 | Dietrichson | Nov. 6, 1956 |
| 2,806,436 | Johnston | Sept. 17, 1957 |
| 2,837,039 | Schueder | June 3, 1958 |
| 2,860,230 | Rapasky | Nov. 11, 1958 |